United States Patent [19]

Frodigh et al.

[11] Patent Number: 5,909,469

[45] Date of Patent: Jun. 1, 1999

[54] LINK ADAPTATION METHOD FOR LINKS USING MODULATION SCHEMES THAT HAVE DIFFERENT SYMBOL RATES

[75] Inventors: Carl Magnus Frodigh, Kista; Mikael Höök; Frank Müller, both of Sollentuna, all of Sweden; Peter Schramm, Erlangen, Germany; Johan Sköld, Åkersberga, Sweden

[73] Assignee: Telefonaktoebolaget LM Ericsson, Stockholm, Sweden

[21] Appl. No.: 08/921,319

[22] Filed: Aug. 29, 1997

[51] Int. Cl.⁶ .................. H03C 3/00; H04J 3/16; H04B 1/38
[52] U.S. Cl. .................. 375/302; 370/465; 455/552
[58] Field of Search .................. 375/302, 334, 375/222, 223, 308, 261, 279, 208; 370/465, 468, 206, 207, 203; 455/552, 553

[56] References Cited

U.S. PATENT DOCUMENTS

| | | | |
|---|---|---|---|
| 5,363,408 | 11/1994 | Paik et al. | 375/261 |
| 5,369,637 | 11/1994 | Richardson et al. | 370/281 |
| 5,491,457 | 2/1996 | Fecher | 375/302 |
| 5,815,531 | 9/1998 | Dent | 375/298 |
| 5,818,827 | 10/1998 | Usui et al. | 370/344 |
| 5,822,315 | 10/1998 | De Seze et al. | 370/337 |

FOREIGN PATENT DOCUMENTS

| | | |
|---|---|---|
| 0652680 | 5/1995 | European Pat. Off. . |
| WO9411955 | 5/1994 | WIPO . |
| WO95/28814 | 10/1995 | WIPO . |
| WO96/36146 | 11/1996 | WIPO . |
| WO97/13388 | 4/1997 | WIPO . |

OTHER PUBLICATIONS

"Cellular Evolution Into Wideband Services" by Johan Sköld et al., VTC 1995, Jul. 3, 1997.
"Estimation of the Performance of Link Adaption in Mobile Radio", by J. Dunlap et al., 0–7803–2742–x/95, 1995 IEEE.
"A High Speed Data Modem for Digital Cellular Radio", by Jay M. Jacobsmeyer, P.E., 0–7803–4194–5/97, 1997 IEEE, 1997 Wireless Communications Conference.

Primary Examiner—Chi H. Pham
Assistant Examiner—Khai Tran
Attorney, Agent, or Firm—Burns, Doane, Swecker & Mathis, L.L.P.

[57] ABSTRACT

A communication system supports multiple modulation schemes having differing symbol rates. The system supports two modulation schemes that have the same symbol rate and at least one modulation scheme that does not have the same symbol rate. For as long as communication can be carried out using the modulation schemes with the same symbol rate, the system avoids using the modulation scheme with different symbol rate, even if communication can be carried out using this scheme.

27 Claims, 8 Drawing Sheets

LINK ADAPTATION METHOD FOR LINKS USING MODULATION SCHEMES THAT HAVE DIFFERENT SYMBOL RATES

BACKGROUND

This invention generally relates to the field of communication systems and, more particularly, to digital communication systems that supports multiple modulation schemes.

Digital communication systems use a variety of linear and non-linear modulation schemes to communicate voice or data information. These modulation schemes include, Gaussian Minimum Shift Keying (GMSK), Quadrature Phase Shift Keying (QPSK), Quadrature Amplitude Modulation (QAM), etc. GMSK modulation scheme is a non-linear low level modulation (LLM) scheme with a symbol rate that supports a specified user bit rate. In order to increase user bit rate, high-level modulation (HLM) schemes can be used. Linear modulation schemes, such as QAM scheme, may have different level of modulation. For example, 16QAM scheme is used to represent the sixteen variation of 4 bits of data. On the other hand, a QPSK modulation scheme is used to represent the four variations of 2 bits of data. Although 16QAM scheme provides a higher bit rate than QPSK, both of these modulation schemes could have the same symbol rate. Application of modulation schemes, however, differ in many aspects, for example symbol rate and/or burst format, which complicates their support in systems that use multiple modulation schemes.

In wireless digital communication systems, standardized air interfaces specify most of system parameters, including modulation type, burst format, communication protocol, symbol rate, etc. For example, European Telecommunication Standard Institute (ETSI) has specified a Global System for Mobile Communications (GSM) standard that uses time division multiple access (TDMA) to communicate control, voice and data information over radio frequency (RF) physical channels or links using GMSK modulation scheme at a symbol rate of 271 ksps. In the U.S., Telecommunication Industry Association (TIA) has published a number of Interim Standards, such as IS-54 and IS-136, that define various versions of digital advanced mobile phone service (D-AMPS), a TDMA system that uses a Differential QPSK (DQPSK) modulation scheme for communicating data over RF links.

TDMA systems subdivide the available frequency band into one or several RF channels. The RF channels are divided into a number of physical channels corresponding to time slots in TDMA frames. Logical channels are formed from one or more physical channels, where modulation and channel coding schemes are specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. Although digital techniques gain more useful channels from a given frequency spectrum, there still remains a need to reduce interference, or more specifically to increase the ratio of the carrier signal strength to interference, (i.e., carrier-to-interference (C/I)) ratio. RF links that can handle lower C/I ratios are considered to be more robust than those that only can handle higher C/I ratios.

In order to provide various communication services, a corresponding minimum user bit rate is required. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation scheme, and for a TDMA system, the number of assignable time slots per call.

Depending on the modulation scheme used, link quality deteriorates more rapidly as C/I levels decrease. Higher level modulation schemes are more susceptible to low levels of C/I ratio than lower level modulation schemes. If a HLM scheme is used, the data throughput or grade of service drops very rapidly with a drop in link quality. On the other hand, if a LLM scheme is used, data throughput or grade of service does not drop as rapidly under the same interference conditions. Therefore, link adaptation methods, which provide the ability to change modulation and/or coding based on the channel conditions, are used to balance the user bit rate against link quality. Generally, these methods dynamically adapt a system's combination of speech coding, channel coding, modulation, and number of assignable time slots to achieve optimum performance over a broad range of C/I conditions.

One evolutionary path for next generation of cellular systems is to use high-level modulation (HLM), e.g., 16QAM modulation scheme, to provide increased user bit rates compared to the existing standards. These cellular systems include enhanced GSM systems, enhanced D-AMPS systems, International Mobile Telecommunication 2000 (IMT-2000), etc. A high level linear modulation, such as 16QAM modulation scheme, has the potential to be more spectrum efficient than, for example, GMSK, which is a low-level modulation (LLM) scheme. Furthermore, the use of 16QAM modulation scheme in conjunction with a higher symbol rate significantly increase the user bit rate compared to the GMSK modulation scheme. In this way, the maximum user bit rate offered by an HLM scheme, such as 16QAM modulation scheme, may be more than doubled. Because higher level modulation schemes require a higher minimum C/I ratio for acceptable performance, their availability in the system becomes limited to certain coverage areas of the system or certain parts of the cells, where more robust links can be maintained. However, a system can be planned to provide full coverage for HLM scheme. The modulation schemes provided in a cell may be a mixture of non-linear and linear modulation, with different symbol rates.

Using the same symbol rate, a conventional link adaptation method uses two linear modulation schemes with different modulation levels, e.g., 16QAM and QPSK modulation schemes, to decrease, for instance, transmission time by switching to a higher level modulation if link quality is sufficient. However, this method does not consider complications arising from using multiple modulation schemes that have different symbol rates. By introduction of link adaptation algorithms, adaptation of coding and/or modulation scheme becomes more frequent. The frequent link adaptations result in an increased signalling effort with a corresponding degradation of speech or user data performance. The demodulation of GMSK and 16QAM modulation schemes are quite different from each other. As a result, with modulation schemes having different symbol rates, the process of demodulation switching at receivers becomes lengthy and complicated, causing degradation in communication quality. Therefore, there exists a need for an efficient and fast method of link adaptation when symbol rates of the modulation schemes are different from each other.

SUMMARY

The present invention that addresses this need is exemplified in a link adaptation method that uses a second low level modulation scheme to provide modulation switching between a third modulation scheme that has the same symbol rate as the second modulation scheme and a first modulation scheme that has a symbol rate different from the second and third modulation schemes.

The link adaptation method according to the invention determines whether a base station and a mobile station can communicate with each other using the first, second, or third modulation schemes. The link adaptation method uses the second modulation scheme, if the mobile station and the base station can not communicate with acceptable communication performance using the third modulation scheme, even if they can communicate with each other satisfactorily using the first modulation scheme.

According to some of the more detailed features of the invention the first modulation scheme is a non-linear modulation scheme and the second and third modulation schemes are linear modulation schemes. For example, the first modulation scheme is GMSK modulation scheme, the second modulation scheme is QPSK modulation scheme, and the third modulation scheme is higher level 16QAM modulation scheme. Preferably, the second modulation scheme uses a reduced signal set of third modulation scheme. The second and third modulation schemes use the same pulse shaping and burst format as well as an identical training sequence.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
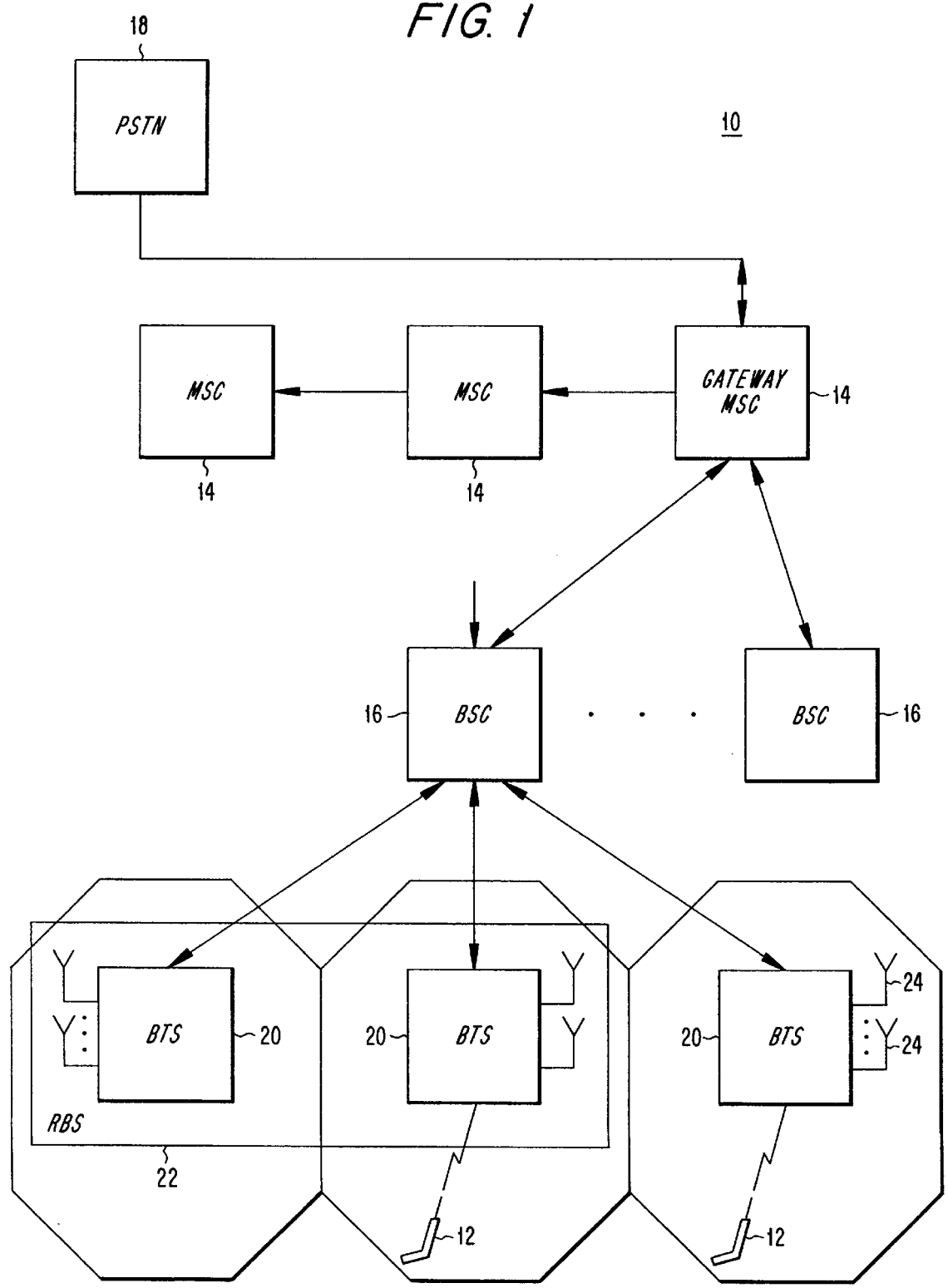
FIG. 1 is a block diagram of a communication system which advantageously uses the present invention.

Referring to FIG. 1, a communication system 10 according to an exemplary embodiment of the present invention supports multiple modulation schemes. In an exemplary embodiment of the invention, the system 10 supports a first LLM (LLM1) scheme, which is a non-linear modulation scheme, such as GMSK modulation scheme used in GSM systems. Preferably, system 10 also supports a HLM modulation scheme, which is a higher level linear modulation scheme, for example, 16QAM scheme.

The mode of operation of GSM communication systems is described in European Telecommunication Standard Institute (ETSI) documents ETS 300 573, ETS 300 574 and ETS 300 578, which are hereby incorporated by reference. Therefore, the operation of the GSM system is described to the extent necessary for understanding of the present invention. Although, the present invention is described as embodied in a GSM system, those skilled in the art would appreciate that the present invention could be used in a wide variety of other digital communication systems, such as those based on PDC or D-AMPS standards and enhancements thereof. The present invention may also be used in CDMA or a hybrid of CDMA and TDMA communication systems.

The communication system 10 covers a geographical area that is subdivided into communication cells, which together provide communication coverage to a service area, for example, an entire city. Preferably, the communication cells are patterned according to a cell pattern that allows some of the spaced apart cells to use the same uplink and downlink RF channels. In this way, the cell pattern of the system 10 reduces the number of RF channels needed to cover the service area. The system 10 may also employ frequency hopping techniques, for example, to avoid "deadspots."

According to the present invention, the system 10 supports a second LLM (LLM2) scheme that has a symbol rate that is the same as the symbol rate of HLM scheme. Under this aspect of the invention, link adaptation is performed between LLM1, LLM2, and HLM schemes. In an exemplary embodiment, LLM2 scheme is a QPSK scheme, which has the same symbol rate as the HLM 16QAM scheme.

Figures 2A, 2B:
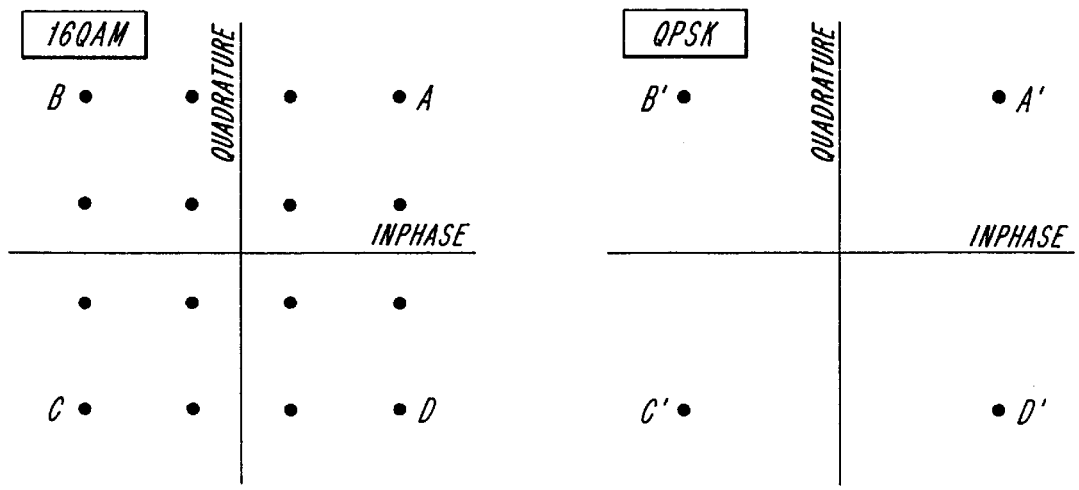
FIG. 2(a) an 2(b) are diagrams of modulation constellations of a 16QAM and QPSK modulation schemes, respectively.

Referring to FIGS. 2(a) and 2(b), the signal sets in modulation constellations of 16QAM scheme and QPSK scheme are shown, respectively. The outer signal points of 16QAM scheme are shown by points A, B, C, and D, and the signal points of QPSK scheme are shown by points A', B', C', and D'. QPSK scheme can be viewed as having a reduced signal set relative to 16QAM scheme. If the symbol rates of QPSK and 16QAM schemes are the same, a 16QAM demodulator can demodulate the reduced signal set of QPSK modulation scheme by using exclusively the outer signal points A, B, C and D of 16QAM scheme. Consequently, the same demodulator can be used to demodulate signals that are modulated with QPSK and 16QAM schemes, if the same pulse shaping and burst format is used for both of these schemes. This arrangement significantly facilitates demodulation switching between QPSK and 16QAM schemes during link adaptation. One such demodulation method is described in a concurrently filed patent application titled "A METHOD FOR DEMODULATING INFORMATION IN A COMMUNICATION SYSTEM THAT SUPPORTS MULTIPLE MODULATION SCHEMES," which is hereby incorporated by reference.

The present invention takes advantage of the ease of demodulation switching with modulation schemes that have the same symbol rate, pulse shaping, burst format, and a reduced signal set relative to each other. More specifically, the communication system 10 determines whether a base station and a mobile station 12 can communicate with each other using LLM1, LLM2, or HLM schemes. The communication system 10 uses LLM2 scheme, if the mobile station 12 and the base station can not communicate with each other with acceptable communication performance using HLM scheme, even if they can communicate with each other using LLM1 scheme with acceptable communication performance. In this way, the communication system communicates with the mobile stations 12 using HLM scheme within a first coverage area that may support LLM1, LLM2, and HLM schemes and communicates with the mobile station's 12 using LLM2 scheme within a second coverage that supports both LLM1 and LLM2 schemes but not HLM scheme. It will be understood by one skilled in the art that the present invention is not limited to the described exemplary modulation schemes of LLM1, LLM2 and HLM. Several modulation schemes can be applied to systems with different channel coding schemes.

The system 10 is designed as a hierarchical network with multiple levels for managing calls. Using an allocated set of uplink and downlink RF links, mobile stations 12 operating within the system 10 participate in calls using allocated time slots. At a high hierarchal level, a group of Mobile Service Switching Centers (MSCs) 14 are responsible for the routing of calls from an originator to a destination. In particular, they are responsible for setup, control and termination of calls. One of the MSCs 14, known as the gateway MSC, handles communication with a Public Switched Telephone Network (PSTN) 18, or other public and private networks. The communication system 10 uses the present invention to provide for link adaptation, when mobile stations 12 within a cell move within coverage areas that support one or more of LLM1, LLM2, HLM schemes.

At a lower hierarchical level, each one of the MSCs 14 are connected to a group of base station controllers (BSCs) 16. The primary function of a BSC 16 is radio resource management. For example, based on reported received signal strength at the mobile stations 12, the BSC 16 determines whether to initiate a hand over. Under the GSM standard, the BSC 16 communicates with a MSC 14 under a standard interface known as the A-interface, which is based on the Mobile Application Part of CCITT Signaling System No. 7.

At a still lower hierarchical level each one of the BSCs 16 controls, a group of base transceiver stations (BTSs) 20. Each BTS 20 includes a number of TRXs that use the uplink and downlink RF channels to serve a particular common geographical area. The BTSs 20 primarily provide the RF links for the transmission and reception of data bursts to and from the mobile stations 12 within their designated cell. In an exemplary embodiment, a number of BTSs 20 are incorporated into a radio base station (RBS) 22. The RBS 22 may be configured according to a family of RBS-2000 products, which is offered by Ericsson, the assignee of the present invention.

Figure 3:
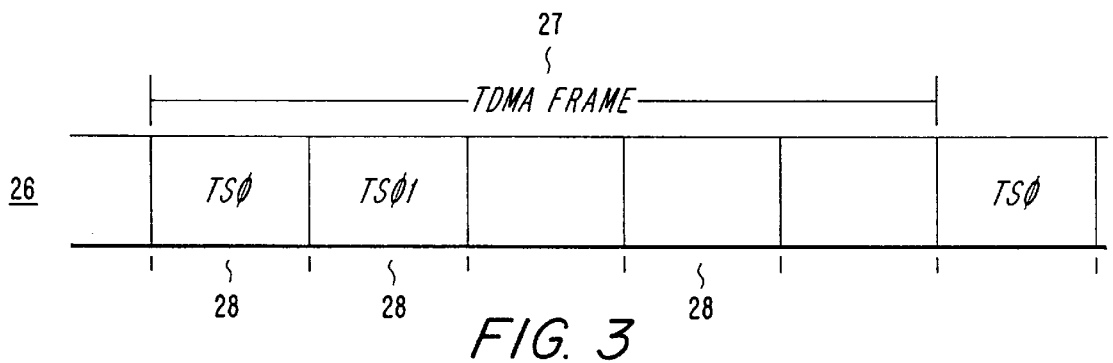
FIG. 3 is a diagram of a subdivided RF channel that is used in the communication system of FIG. 1.

With reference to FIG. 3, an RF channel 26 (uplink or downlink) is divided into repetitive time frames 27 during which information are communicated. Each frame 27 is further divided into time slots 28 that carry packets of information. Speech or data is transmitted during time slots designated as traffic channels (TCH$_1$, . . . , TCH$_n$). All signaling functions pertaining to call management in the system, including initiations, hand overs, and termination are handled via control information transmitted over control channels.

The mobile stations 12 use slow associated control channels (SACCHs) to transmit associated control signals, such as an RX-LEV signal, which corresponds to the received signal strength at the mobile station 12 and RX-QUAL signal, which is a measure of various levels of bit error rate at the mobile station 12, as defined by the GSM standard. Fast associated control channels (FACCHs) perform control functions, such as hand-overs, by stealing bursts for the allocated TCHs.

The BSC 16 instructs the RBS 22 based on measures of channel characteristics of RF links between mobile stations 12 to the RBS 22. As described later in detail, the channel characteristics may be measured based on a number of parameters, including received signal strength at the mobile station 12, bit error rate at the mobile station 12, the multipath propagation property of the uplink RF channel, for example, time dispersion, or a combination of them.

The system 10 carries out the transmission of information during a time slot in a burst that contain a predefined number of coded bits. The GSM specification defines various types of bursts: normal burst (NB), frequency correction burst (FB), synchronization burst (SB), access burst (AB), and dummy burst. The normal burst, which has a duration of 576 μs, is used both during the traffic and some control signalling channels. The remaining bursts are primarily used for access and maintaining signal and frequency synchronization within the system.

Figure 4:
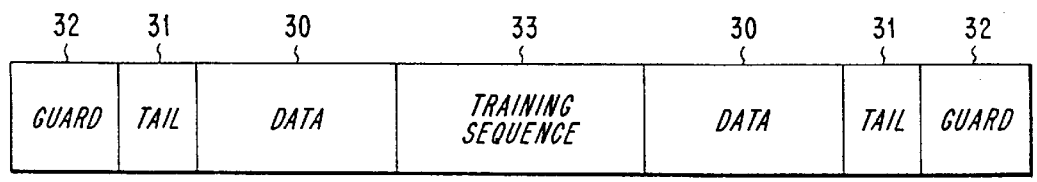
FIG. 4 is a diagram of a normal transmission burst transmitted on the RF channel of FIG. 2.

As shown in FIG. 4, a normal burst 29 includes two separate data portions 30 during which digital data bits are communicated. The normal burst also includes tail and guard sections 31 and 32 as shown. Among other things, the guard section 32 is used to allow for up-ramping of the burst and for down-ramping of the bursts. The tail section 31 is used for demodulation purposes. All burst transmissions, except dummy burst transmissions, include training sequences. The training sequences are patterned with predefined autocorrelation characteristics. During demodulation process, the auto correlation characteristic of the training sequence helps in the synchronization of the received bit sequences over an RF channel. In the normal burst 29, a training sequence 33 is positioned in the middle of the burst between its data portions.

In order to compensate for propagation delays, the communication system 10 uses a time alignment process by which the mobile stations 12 align their burst transmissions to arrive at the BTSs 20 in proper time relationship relative to other bursts transmissions. As described later, the mobile station 12 and the RBS 22 incorporate equalizers, which correlate received baseband bit sequences over the uplink or downlink RF channels with the training sequences, to provide correlator responses that correspond to the properties of multipath propagation. Based on the correlator responses, the receiver section of the BTS 20 generates a timing advance (TA) parameter, which corresponds to a propagation delay over the uplink RF channel. The mobile station 12 uses the TA parameter, which is transmitted from the RBS 22, for advancing or retarding its burst transmissions relative to a time reference.

Figure 5:
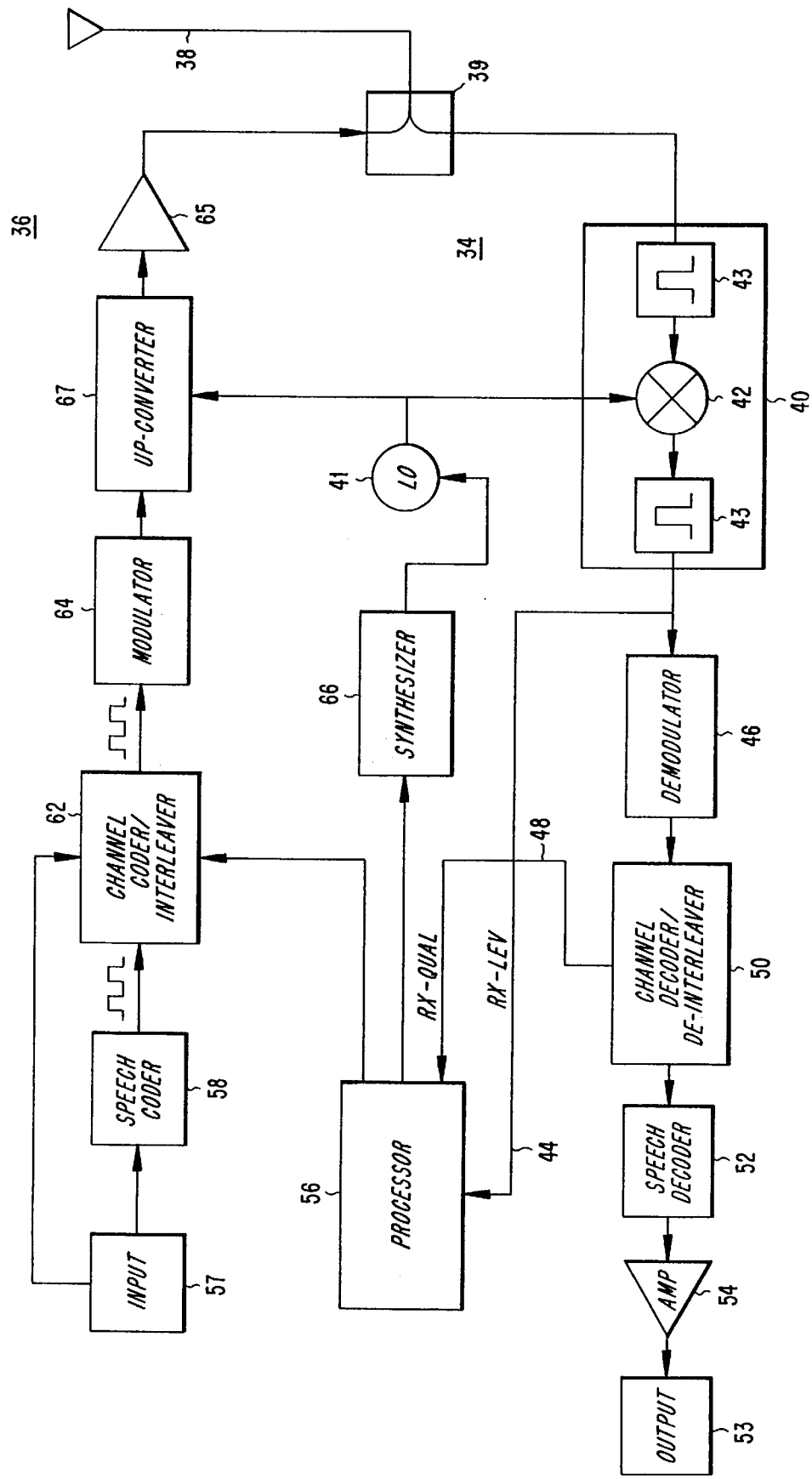
FIG. 5 is a block diagram of a mobile station used in the communication system of FIG. 1.

With reference to FIG. 5, the block diagram of a mobile station 12 is shown. The mobile station 12 includes a receiver section 34 and a transmitter section 36, which are coupled to an antenna 38 through a duplexer 39. The antenna 38 is used for receiving and transmitting RF signals to and from the BTS 20 over allocated uplink and downlink RF channels. The receiver section 34 includes an RF receiver 40, which includes a local oscillator 41, a mixer 42, and selectivity filters 43 arranged in a well known manner, for down-converting and demodulating received signals to a baseband level. The RF receiver 40, which is tuned by the local oscillator 41 to the downlink channel, also provides an RX-LEV signal on line 44 that corresponds to the received signal strength at the mobile station 12.

The RF receiver provides a baseband signal to a demodulator 46 that demodulates coded data bits representing the received speech, data and signaling information. Depending on the type of mobile station 12, the demodulator 46 can support one or more demodulation schemes corresponding to LLM1, LLM2, and HLM schemes. For example, the demodulator of a mobile station 12 subscribed to an operator that supports LLM1 scheme may be capable of demodulating LLM1 modulated signals only. On the other hand, the demodulator of a mobile station 12 subscribed to an operator that supports all of the three modulation schemes is preferably capable of demodulating LLM1, LLM2, and HLM schemes.

As described above, the demodulator 46 includes an equalizer (not shown) that processes the coded bit pattern disposed on the training sequences, to provide correlator response that are used for predictive demodulation of the baseband signal. The equalizer uses the correlator responses to determine the most probable bit sequence for demodulation. As defined by the GSM specification, a channel decoder/interleaver 50 also provides an RX-QUAL signal on line 48, which is a measure of various levels of bit error rate at the mobile station 12. The mobile station 12 reports the RX-QUAL signal and the RX-LEV signal to the BSC 16 on a SACCH channel.

Preferably, bursts modulated according to LLM2 and HLM scheme, i.e., 16QAM and QPSK schemes, use the same pulse shaping, symbol rate and burst format, and use the same training sequences. Both modulation schemes use the same signal points to modulate the training sequence. For example, a 16 QAM modulator modulates the training sequence using outer signal points A, B, C, and D, (shown in FIG. 2(a)). Similarly, a QPSK modulated signal, which has a reduced signal set relative to 16QAM modulated signal, uses signal points A', B', C', and D' (shown in FIG. 2(b)) for transmitting the training sequence. In this way, the mobile station 12 can use the same demodulator, i.e., a 16QAM demodulator, to demodulate the training sequence. This arrangement significantly facilitates decoding of the training sequence of both HLM and LLM2 modulated signals.

The channel decoder/de-interleaver 50 decodes and de-interleaves the demodulated signal. The speech data bits are applied to a speech decoder 52 that decodes the speech pattern using one of a variety of speech decoding algorithms. After decoding, the speech decoder 52 applies an analog speech signal to a output device 53, e.g., a speaker, via an audio amplifier 54. The channel decoder 50 provides the decoded data and signalling information to a microprocessor 56 for further processing, for example, displaying the data to a user.

The transmitter section 36 includes an input device 57, e.g., a microphone and/or keypad, for inputting voice or data information. According to a specified speech/data coding techniques, a speech coder 58 digitizes and codes the voice signals according to a variety of supported speech coding schemes. A channel coder/interleaver 62 codes the uplink data according to a specified coding/interleaving algorithms, which improves error detection and correction at the BTS 20. The channel coder/interleaver 62 provides an uplink baseband signal to a modulator 64. The modulator 64 modulates the uplink baseband signal according to one or more of supported modulation schemes. Similar to the demodulator 46, the modulator 64 of the mobile station 12 may support one or more of LLM1, LLM2, and HLM schemes.

The modulator 64 applies the coded signal to an up-converter 67, which receives a carrier signal from the up-converted signal local oscillator 41. An RF amplifier 65 amplifies the up-converted signal for transmission trough the antenna 38. A well known frequency synthesizer 66, under the control of the microprocessor 56, supplies the operating frequency information to the local oscillator 41. The microprocessor 56 causes the mobile station 12 to transmit the RX-QUAL and RX-LEV parameters to the RBS 22 over the SACCH.

Figure 6:
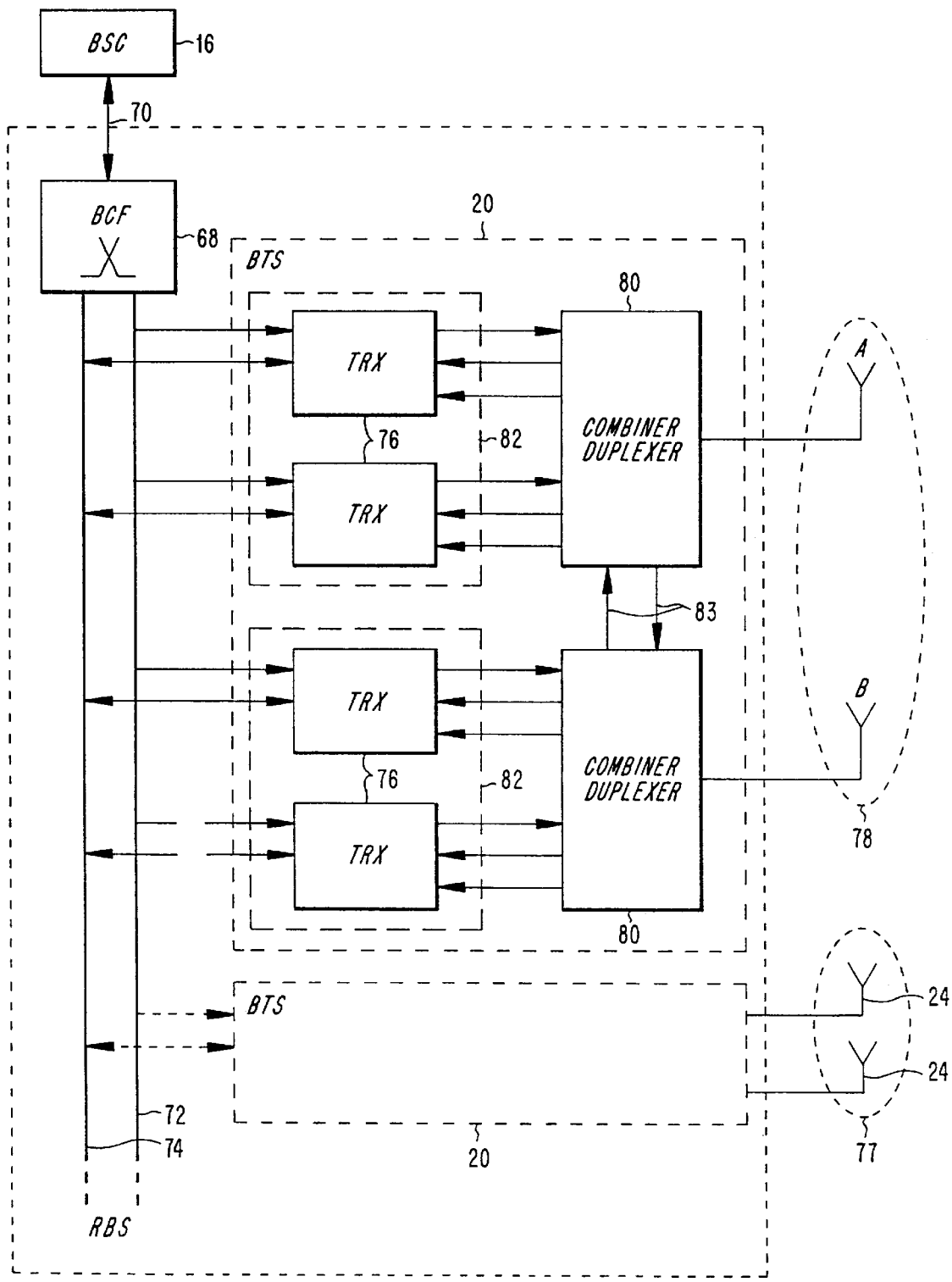
FIG. 6 is a block diagram of a radio base station used in the communication system of FIG. 1.

Referring to FIG. 6, an exemplary block diagram of the RBS 22 is shown to include a plurality of BTSs 20 that serve different geographical areas. Through a timing bus 72, the BTSs 20 are synchronized with each other. Voice and data information are provided to and from the RBS 22 through a traffic bus 74 that may be coupled, through the A-bis interface, to a public or private voice and data transmission line, such as a T1 line (not shown). Each BTS 20 includes TRXs 75 and 76 that communicate with the mobile station 12. As shown, two antennas designated as 24A and 24B are spaced accordingly to cover cells 77 and 78. The TRXs 76 are coupled to the antennas 24 through combiner/duplexers 80 that combine downlink transmission signals from the TRXs 76 and distribute the uplink received signals from the mobile station 12. The RBS 22 also includes a base station common function (BCF) block 68 that controls the operation and maintenance of the RBS 22.

Figure 7:
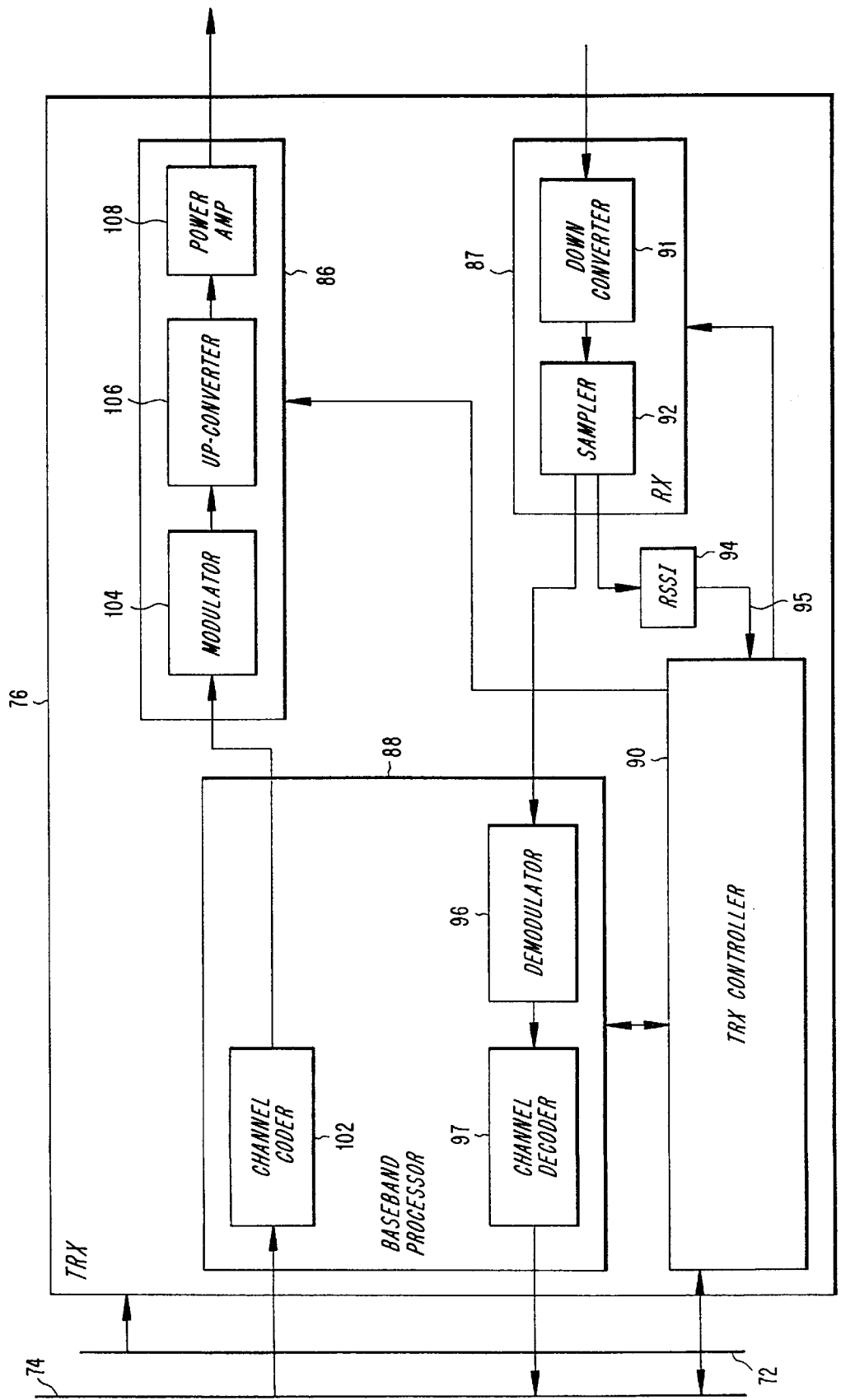
FIG. 7 is a block diagram of a radio transceiver used in the base station of FIG. 6.

Referring to FIG. 7, a block diagram of a TRX 76 is shown. The TRX 76 includes a transmitter section 86, a receiver section 87, a baseband processor 88 and a TRX controller 90. Through a corresponding antenna 24 (shown in FIG. 6), the receiver section 87 receives uplink signals from the mobile station 12. A down-conversion block 91 down-converts the received signal. After down-converting the received signals, the receiver section 87 samples its phase and magnitude, via a sampler block 92, to provide received bit sequence to the baseband processor 88. An RSSI estimator 94 provides an RSSI signal on line 95, which is a measure of the received signal strength. The RSSI estimator 94 may also measure noise disturbance levels during idle channels. The TRX controller 90, which is coupled to the traffic bus 74, processes the commands received from the BSC 16 and transmits TRX related information, such as various TRX measurements, to the BSC 16. Under this arrangement, the TRX 76 periodically reports the RSSI signal and noise disturbance levels to the BSC 16.

The baseband processor 88 includes a demodulator 96 that receives uplink baseband data from the receiver section 87. The demodulator 96 generates correlator responses that are processed in a well known manner to retrieve the uplink baseband data. The demodulator 96 may support demodulation of signals that are modulated using one or more of LLM1, LLM2 or HLM schemes. The uplink baseband data is applied to a channel decoder 97 that decodes the baseband signal according to one or more supported channel decoding scheme. The channel decoder 97 places the decoded baseband signal on the traffic bus 78, for further processing by the BSC 16.

When transmitting downlink baseband data, the baseband processor 88 receives properly coded data or digitized speech information from the BSC 16 over the traffic bus 74 and applies them to a channel coder 102 that codes and inter-leaves speech and data according to one or more of supported channel coding schemes. The transmitter section includes a modulator 104 that modulates the supplied data bits according to one or more of LLM1, LLM2, and HLM schemes. The modulator 104 provides downlink baseband signals to an up-conversion block 106 for up-conversion. A power amplifier 108 amplifies the up-converted signal for transmission through a corresponding antenna.

The system 10, for example, uses one or a combination of the RX-QUAL, RX-LEV, or TA parameters, which are measures of channel characteristic of an RF link, to decide whether a link adaptation procedure should be initiated or not. The BSC 16 compares the channel characteristic parameter to corresponding thresholds to determine whether to perform a link adaptation, or inter-cell or intra-cell handover.

Figure 8:
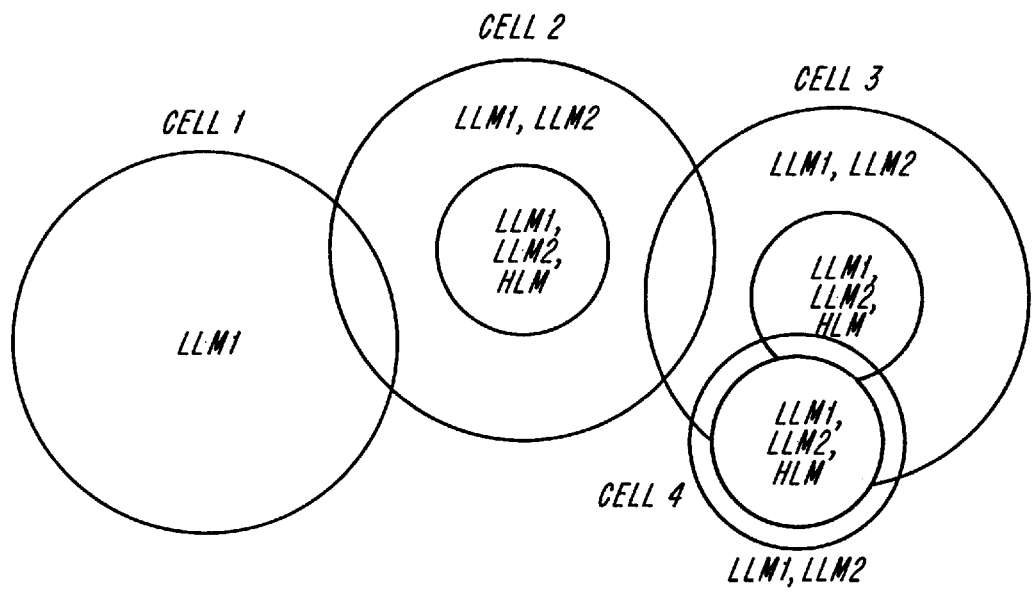
FIG. 8 is a diagram of an exemplary cell arrangement.

Referring to FIG. 8, a diagram of an exemplary cell arrangement comprising Cells 1, 2, 3, and 4 is shown. It is assumed that Cell 1 only supports LLM1 scheme and Cells 2–4 support all of LLM1, LLM2 and HLM schemes. An inter-cell handover procedure when a mobile station 12 capable of using LLM1, LLM2 and HLM scheme is moving from Cell 1 to Cell 2 is carried out by allowing the mobile station 12 to use either LLM1, LLM2, or HLM scheme, after the inter-cell handover is completed. Initial selection of modulation scheme would preferably depend on either the measured and/or predicted channel characteristic of a new RF link. Due to a possible difference in link robustness for LLM1, LLM2, and HLM schemes, the mobile station 12 may continue to use LLM1 scheme until the channel characteristic allows the use of other schemes, in which case a link adaptation procedure is initiated to switch modulation scheme from LLM1 scheme to LLM2, or HLM scheme.

Another inter-cell handover scenario happens when a mobile station 12 is moving between two cells that support all of LLM1, LLM2 and HLM schemes, for example, Cell 2 and Cell 3. Most probably, a mobile station 12 that uses LLM2 scheme in Cell 2 continues to use LLM2 scheme in Cell 3, without initiating a link adaptation procedure. Depending on channel characteristic of available links, however, a link adaptation procedure may be initiated to allow the mobile station 12 to use LLM1 or HLM scheme.

Under yet another inter-cell handover scenario, the system 10 allows a mobile station 12 that uses HLM scheme in one cell, e.g. Cell 3, to continue to use HLM scheme in another cell, e.g.,Cell 4, which has an overlapping coverage area that supports HLM scheme. When channel characteristics on a new link allow the use of HLM scheme in a new cell, while a mobile is using LLM2 scheme in a current cell, for example, because of degraded channel characteristic of a current link, the mobile station 12 may use HLM scheme directly after an inter-cell handover. When a mobile station 12 that can use HLM, LLM2, and LLM1 schemes moves into an area where exclusively LLM1 is supported, a link adaptation procedure is initiated to switch the modulation scheme from LLM2 or HLM scheme to LLM1 scheme. It should be noted that the system may restrict the use of modulation schemes to LLM1 to avoid degradation of C/I ratio.

Figure 9:
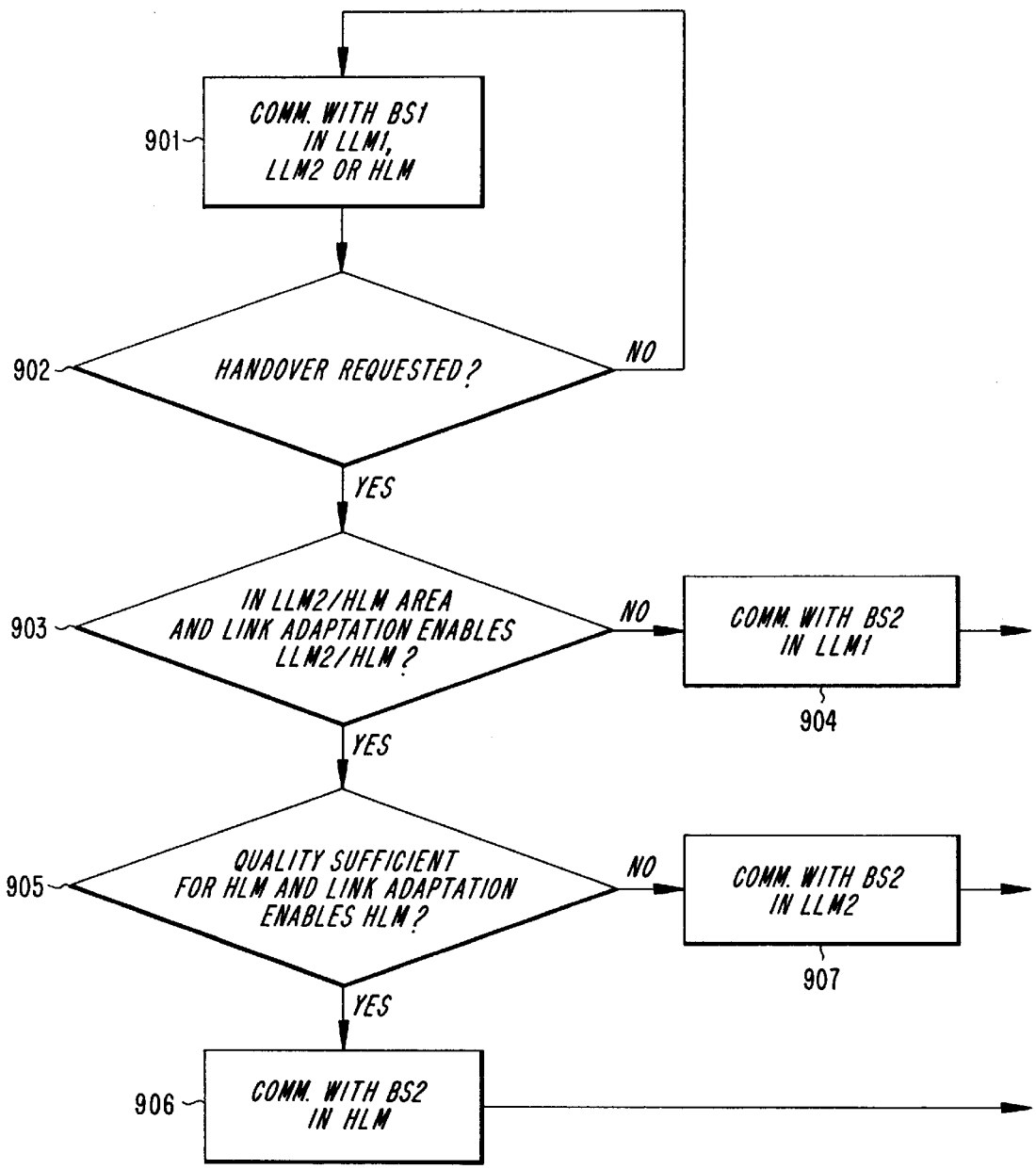
FIG. 9 is a flow chart of an inter-cell handover method used in the communication system of FIG. 1.

FIG. 9 shows the flow chart of an inter-cell handover procedure from one cell with a BTS 20 (BS1) to another cell with a BTS 20 (BS2). First, the mobile station 12 (MS) establishes an RF link to BS1. The MS may, for example, communicate using either LLM1, LLM2, or HLM schemes, block 901. As soon as an inter-cell handover condition is detected, the MS is requested to perform a well known hand-over procedure, block 902. Preferably, hand-over and link adaptation procedures are performed concurrently, if the coverage area at the new cell requires the use of a different modulation schemes than the one used prior to the inter-cell hand-over. Consequently, as soon as the inter-cell hand-over request is accepted, the system determines whether MS and BS2 can communicate with acceptable communication performance using LLM1, LLM2 or HLM schemes, block 903. If coverage area supports only LLM1 scheme, the communication between MS and BS2 is carried out using LLM1 scheme, block 904. In case the coverage area supports both LLM2 and HLM schemes, the system determines whether the link quality is sufficient for HLM or LLM2 schemes, block 905. If a determination is made that the channel characteristics of an available link allows the use of HLM scheme, a link adaptation procedure is initiated to allow the use of HLM scheme, block 906. Otherwise the link adaptation procedure selects LLM2 scheme, if possible, even if communication using LLM1 scheme provides acceptable communication performance, block 907.

Figure 10:
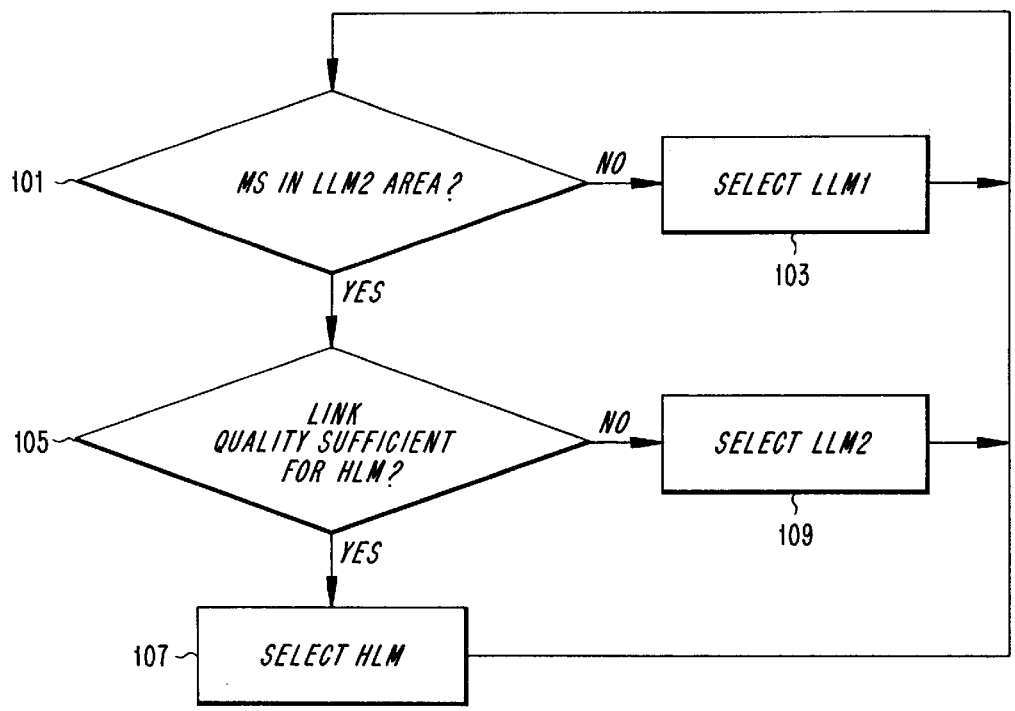
FIG. 10 is a flow chart of a link adaptation method according to one embodiment of the invention.

Referring to FIG. 10, a flow chart of a link adaptation method according to the present invention for selecting modulation scheme within the coverage area of a cell is shown. The system 10 monitors if the MS is in an LLM2 area, block 101, for instance, if MS is in a cell supporting LLM2 scheme. If MS is not in a LLM2 area, the link adaptation method selects LLM1 scheme, block 103. In a well known manner, link quality is determined by continuous measurements of channel characteristics. A determination is made as to whether the link quality can support HLM scheme, block 105. If so, HLM scheme is selected, block 107. Otherwise, LLM2 scheme is selected, block 109. Subsequently, the link quality is continually monitored. If link quality is degraded, then the link adaptation method selects LLM2 scheme, even when the link can support LLM1 scheme.

For as long as MS and BSs are capable of using LLM2 scheme within a cell, the link adaptation procedure does not switch the modulation scheme to LLM1 scheme, even if LLM1 can be used. The link adaptation methods of the invention continues to use LLM2 scheme to communicate using the symbol rate of HLM. In this way, the system avoids changing the symbol rate when switching between LLM2 and HLM schemes. By using the same symbol rate,, communication quality of the system is improved, because changing the symbol rate during communication degrades communication quality.

Figure 11:
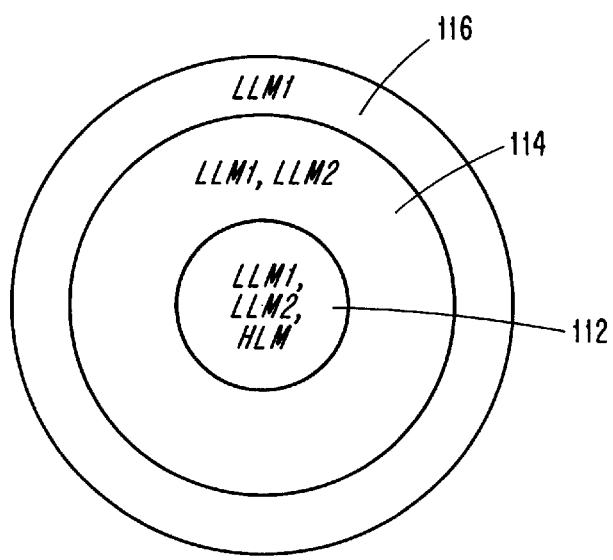
FIG. 11 is a diagram of another exemplary cell arrangement.

Referring to FIG. 11, a cell having various coverage areas that support corresponding LLM1, LLM2, and HLM schemes is shown. As shown, a coverage area 112 supports all of the three modulation schemes. Another area of the cell 114, only supports LLM1 and LLM2 schemes. Finally, yet another coverage area 116 of the cell supports LLM1 scheme only.

Figure 12:
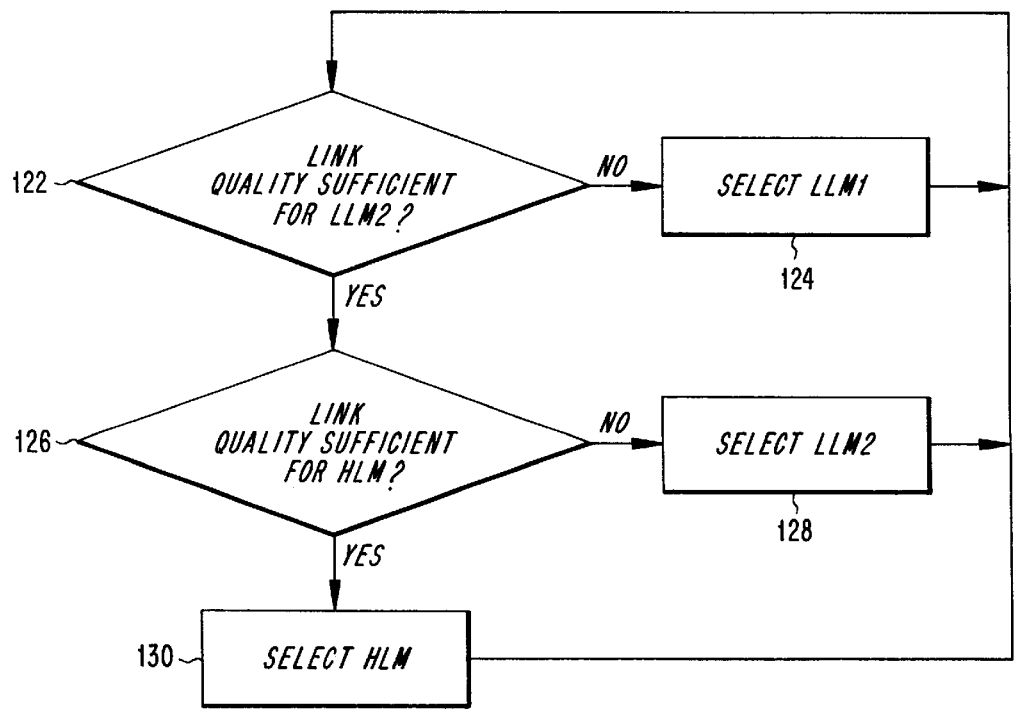
FIG. 12 is a flow chart of a link adaptation method according to another embodiment of the invention.

Referring to FIG. 12, the flow chart of a link adaptation procedure within the coverage areas of the cell of FIG. 11 is shown. If link quality is insufficient for the use of LLM2 scheme, then the link adaptation procedure selects LLM1 scheme, blocks 122 and 124. Otherwise a determination is made as to whether link quality is sufficient for the use of HLM scheme, block 126. If link quality is insufficient for the use of HLM scheme, but sufficient for the use of LLM2 scheme, the link adaptation method of the present invention selects LLM2 scheme block 128, even if the link could support LLM1 scheme. Otherwise, if link quality is sufficient for the use of HLM scheme, the link adaptation procedure selects the HLM scheme for carrying on with communication, block 130. During the communication using either one of LLM1, LLM2, or HLM schemes, the link quality is continually monitored. The link adaptation procedure of the invention switches modulation schemes according to the above described method when link quality is changed.

It would appreciated that link adaptation procedure described with respect to the three modulation scheme may be extended to systems that use more than three modulation schemes, including multiple HLM schemes, for example, 16QAM, 32QAM, 64QAM, etc. In this case, signal points of a lower level modulation scheme may consist a reduced signal set of one or several of the higher level modulation schemes. It may also be appreciated that the signal points of a higher level modulation scheme may be a reduced signal set of another higher level modulation scheme. For example, LLM2 scheme may be 16QAM modulation scheme and HLM may be a 32QAM modulation scheme.

From the foregoing it would be appreciated that the link adaptation procedure according to the present invention significantly facilitates modulation selection process in a system that supports multiple modulation schemes with different symbol rates. By providing for an orderly link adaptation between modulation schemes that have the same symbol rate and those that do not have the same symbol rate, the present invention avoids high overhead link adaptation between links with different symbol rates. In this way, the present invention improves communication quality of systems that support multiple modulation schemes. Similar to modulation scheme, it would be appreciated that link adaptation procedure may be performed based on channel coding scheme or a combination of channel coding and modulation schemes.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. A method of communication between a mobile station and a base station comprising the steps of:
   determining whether the base station and the mobile station can communicate with each other using at least a first, a second, or a third modulation schemes, wherein the second and third modulation schemes have the same symbol rate that is different from the symbol rate of the first modulation scheme; and
   using the second modulation scheme, if the mobile station and the base station can not communicate with each other with acceptable performance using the third modulation scheme, even if the mobile station and the base station can communicate with each other using the first modulation scheme.

2. The method of claim 1 further including the step of using the first modulation scheme, if the mobile station and the base station can not communicate with each other with acceptable performance using the second and third modulation schemes.

3. The method of claim 1 further including the step of using the third modulation scheme, if the mobile station and the base station can communicate with each other with acceptable performance using the third modulation schemes.

4. The method of claim 1, wherein the first modulation scheme is a non-linear modulation scheme, and the second and third modulation schemes are linear modulation scheme.

5. The method of claim 4, wherein the second modulation scheme is a linear modulation scheme with a lower level than the third modulation scheme.

6. The method of claim 5, wherein the first modulation scheme is GMSK scheme, the second modulation scheme is QPSK modulation scheme, and the third modulation scheme is 16QAM modulation scheme.

7. The method of claim 4, wherein the second modulation scheme and the third modulation scheme use the same pulse shaping.

8. The method of claim 4, wherein the second modulation scheme uses a reduced signal set of third modulation scheme.

9. The method of claim 4, wherein the second and third modulation schemes use the same burst format.

10. The method in claim 4, wherein the second and third modulation schemes use the same training sequences.

11. A method for communicating within a communication system, comprising:
    communicating with a mobile station that supports at least a first, a second, and a third modulation schemes, wherein the second and third modulation schemes have the same symbol rate, which is different from the symbol rate of the first modulation scheme;
    communicating with the mobile station using the third modulation scheme within a first coverage area that provides acceptable communication performance for the first, second, and third modulation schemes; and
    communicating with the mobile station using the second modulation scheme within a second coverage area that provides acceptable communication performance for both the first and second modulation schemes but not the third modulation scheme.

12. The method of claim 11, wherein the first modulation scheme is a non-linear modulation scheme, and the second and third modulation schemes are linear modulation schemes.

13. The method of claim 12, wherein the second modulation scheme is a lower level linear modulation scheme than the third modulation scheme.

14. The method of claim 13, wherein the first modulation scheme is GMSK scheme, the second modulation scheme is QPSK modulation scheme, and the third modulation scheme is 16QAM modulation scheme.

15. The method of claim 12, wherein the second modulation scheme and the third modulation scheme use the same pulse shaping.

16. The method of claim 12, wherein the second modulation scheme uses a reduced signal set of third modulation scheme.

17. The method of claim 12, wherein the second and third modulation schemes use the same burst format.

18. The method of claim 12, wherein the second and third modulation schemes use the same training sequences.

19. A cellular communication system, comprising:
    at least one base station that covers a first cell using at least a first modulation scheme, a second modulation scheme, and a third modulation scheme, wherein the second and the third modulation schemes have the same symbol rate, which is different from the symbol rate of the first modulation scheme; and
    at least one mobile station supporting the first, second, and third modulation schemes, and wherein the mobile station uses the second modulation scheme when using the third modulation scheme does not provide acceptable communication performance, even if the first modulation scheme provides acceptable communication performance.

20. The cellular system of claim 19 further including another base station that covers a second cell using the first modulation scheme only, wherein the mobile station uses the first modulation scheme when it travels from the first cell to the second cell.

21. The cellular system of claim 19, wherein the first modulation scheme is a non-linear modulation scheme, and the second and third modulation schemes are linear modulation scheme.

22. The cellular system of claim 21, wherein the second modulation scheme is a lower level linear modulation scheme than the third modulation scheme.

23. The cellular system of claim 21, wherein the first modulation scheme is GMSK scheme, the second modulation scheme is QPSK modulation scheme, and the third modulation scheme is 16QAM modulation scheme.

24. The cellular system of claim 21, wherein the second modulation scheme and the third modulation scheme use the same pulse shaping.

25. The cellular system of claim 21, wherein the second modulation scheme uses a reduced signal set of third modulation scheme.

26. The cellular system of claim 21, wherein the second and third modulation schemes use the same burst format.

27. The cellular system of claim 21, wherein the second and third modulation schemes use the same training sequences.

* * * * *